Jan. 25, 1938.   P. E. HAWKINS   2,106,502
POWER CONTROL MECHANISM
Filed Sept. 5, 1936   3 Sheets-Sheet 1
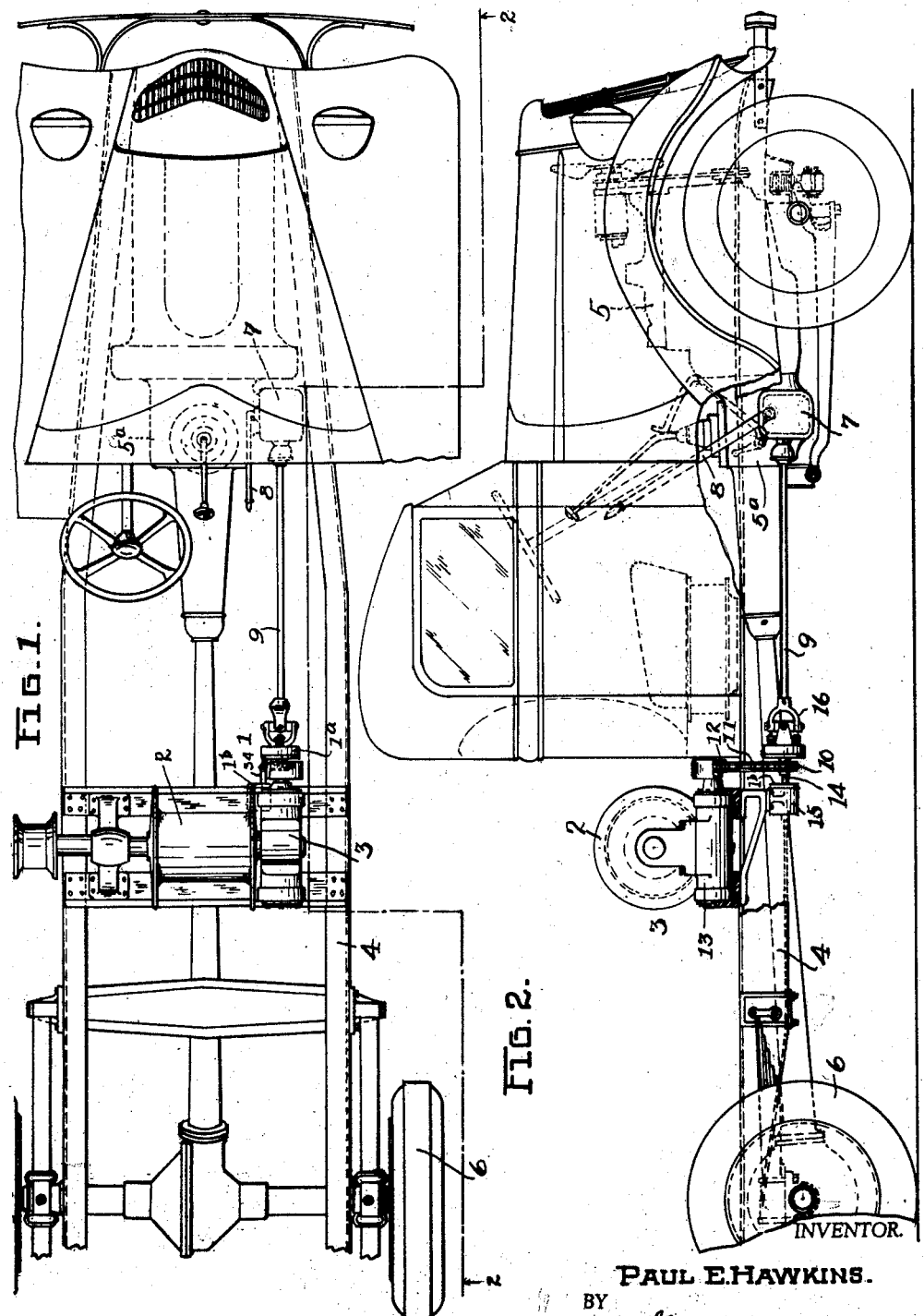
INVENTOR.
PAUL E. HAWKINS.
BY
Geo. B. Pitts
ATTORNEY.

Jan. 25, 1938.    P. E. HAWKINS    2,106,502
POWER CONTROL MECHANISM
Filed Sept. 5, 1936    3 Sheets-Sheet 2

INVENTOR.
Paul E. Hawkins.
BY Geo. R. Pitts
ATTORNEY.

Jan. 25, 1938.  P. E. HAWKINS  2,106,502
POWER CONTROL MECHANISM
Filed Sept. 5, 1936  3 Sheets-Sheet 3
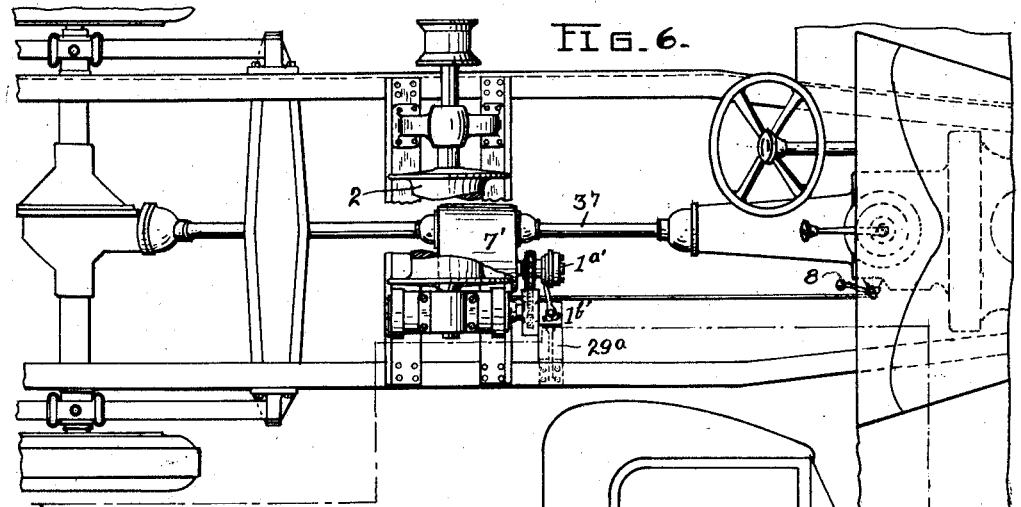
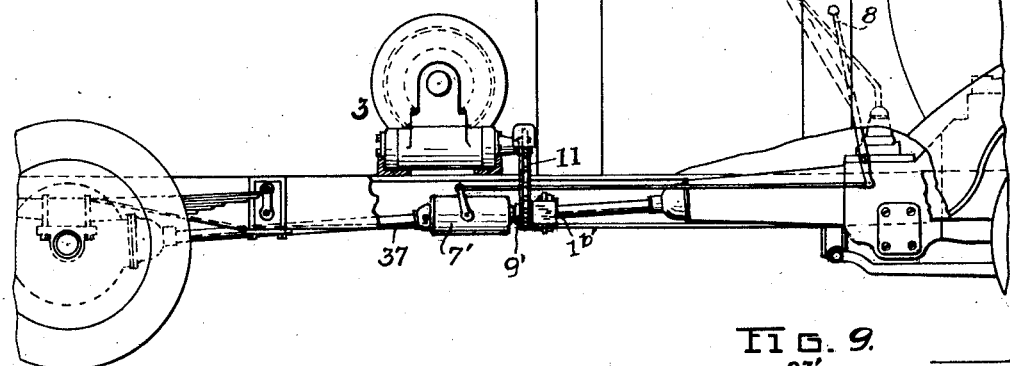
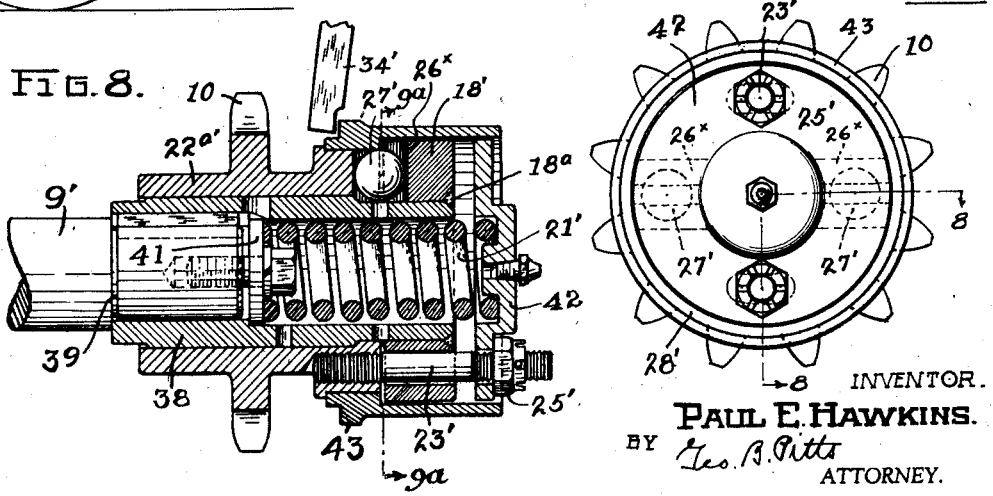
INVENTOR.
PAUL E. HAWKINS.
BY Geo. B. Pitts
ATTORNEY.

Patented Jan. 25, 1938

2,106,502

UNITED STATES PATENT OFFICE 2,106,502

POWER CONTROL MECHANISM

Paul E. Hawkins, Lakewood, Ohio, assignor to The Baker-Raulang Company, Cleveland, Ohio, a corporation of Ohio Application September 5, 1936, Serial No. 99,679

12 Claims. (Cl. 192—150)

This invention relates to an automatic cut-out mechanism for stopping a motor, more particularly a power transmitting mechanism operable as a safety device against damage where the load on the parts driven by the motor and transmitting power therefrom becomes excessive or exceeds that beyond which the parts are set or adjusted. By way of illustration, the mechanism is disclosed as controlling a switch in an electrical circuit, for example, an ignition circuit, where the motor is of the internal combustion type.

One object of the invention is to provide an improved mechanism of this character which is positive in operation and effective to stop the motor immediately the load exceeds the predetermined maximum load.

Another object of the invention is to provide an improved power transmitting mechanism of this character operable to stop the motor without disconnecting parts of the mechanism.

Another object of the invention is to provide an improved power transmitting mechanism having a pair of relatively movable normally biased elements related to the movable contact of an electric switch and operable to move said contact when the load on said mechanism exceeds a predetermined limit.

A further object of the invention is to provide an improved mechanism of this character that comprises few parts, is economically and easily manufactured, assembled and installed and automatically re-adjusts itself to normal operating conditions when the overload on the mechanism is relieved or eliminated, so that manual resetting or adjustment of parts, after each cut-out operation, is avoided.

Other objects of the invention will be apparent to those skilled in the art to which my invention relates from the following description taken in connection with the accompanying drawings, wherein—

Fig. 1 is a fragmentary plan view of a truck showing one application of a mechanism embodying my invention.

Fig. 2 is a section on the line 2—2 of Fig. 1.

Figs. 6 and 7 are views substantially similar to Figs. 1 and 2, respectively, but showing a different embodiment of the invention.

Fig. 8 is a sectional view of the embodiment shown in Figs. 6 and 7 on the line 8—8 of Fig. 9.

Fig. 9 is an end elevation of the parts shown in Fig. 8.

Figure 3:
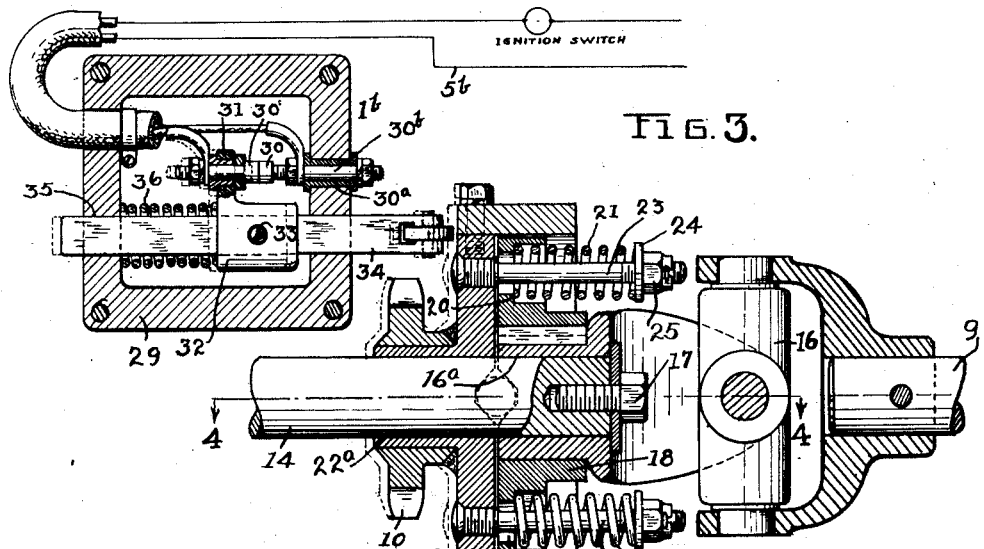
Fig. 3 is a sectional view partly on the line 3—3 of Fig. 5, the electrical circuit being shown diagrammatically.

In the drawings, 1 indicates as an entirety the power transmitting and control mechanism embodying my invention, such mechanism comprising power transmitting elements indicated at 1a and motor control elements indicated at 1b, the power transmitting elements 1a being shown as driving a rotatable member, such as the drum 2 of a winch 3. The winch 3 is shown as mounted on the chassis 4 of a wheel mounted vehicle adapted to support a derrick or other hoisting equipment for raising and handling loads by means of a rope or cable, which winds on and unwinds from the drum 2. In this application of the invention (a) the internal combustion motor 5, which is drivingly connected to the rear wheels 6 of the vehicle through a suitable transmission 5a, is utilized through a suitable power take-off, indicated as an entirety at 7, to drive the power transmitting elements 1a and (b) the motor control elements 1b control the ignition circuit 5b for the motor 5, so that upon the breaking of the circuit, the motor stops. The power take-off 7 may be of any well known construction, its connection with a driven element of the transmission 5a and its disconnection from the latter being controlled by a lever 8, in a well known manner. The driven element of the power take-off 7 is connected to and drives a shaft 9, which, through the power transmitting elements 1a, drives a sprocket 10 or other suitable power element. Where a sprocket 10 is used, it transmits the power by a chain 11 to a sprocket 12, the latter in turn operating through suitable gearing in a housing 13 to rotate the drum 2.

The power transmitting elements 1a shown in Figs. 1, 2, 3, 4, 5 and 5a comprise the following: 14 indicates a shaft suitably mounted at its outer end in bearings in a hanger 15 and connected at its inner end through a universal joint 16 to the shaft 9. That element of the universal joint 16 adjacent the shaft 14 is provided with a collar 16a to receive the shaft end. The base wall of the joint element is connected to the end of the shaft 14 by a bolt 17. 18 indicates an annular member having a hub fitting and keyed to the collar 16a, so as to be driven by the universal joint. The member 18 is formed with a plurality of openings 19 (preferably two in diametrical relation). The openings 19 are enlarged at their inner ends (that is, the ends adjacent the universal joint 16) to form shoulders 20 which serve as seats for coiled springs 21, the purpose of which will later be set forth. 22 indicates a disk having a hub 22a loosely fitting the shaft 14 and supporting the sprocket 10, the latter being secured to the hub as by welding. 23 indicates a plurality of rods, one for each opening 19, mounted on the disk 22. Each rod 23 extends through one of the openings 19 and the adjacent spring 21 and is provided at its free end with a head, preferably consisting of a washer 24 which is fixed in position by a nut 25 threaded on the end portion of the rod. As shown, a spring 21 is interposed between each seat 20 and the adjacent washer 24 and normally tends to force the annular member 18 and disk 22 toward each other and substantially in face to face relation. By adjustment of the nuts 25, the tension of the springs may be increased or decreased to meet various predetermined operating conditions.

Figure 4:
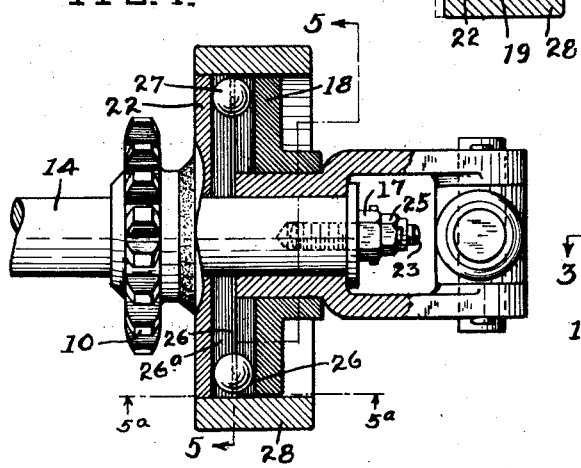
Fig. 4 is a section on the line 4—4 of Fig. 3.
Figure 5:
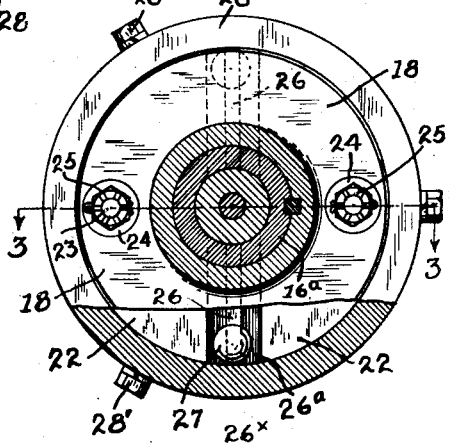
Fig. 5 is a section on the line 5—5 of Fig. 4.
Figures 5A, 10:
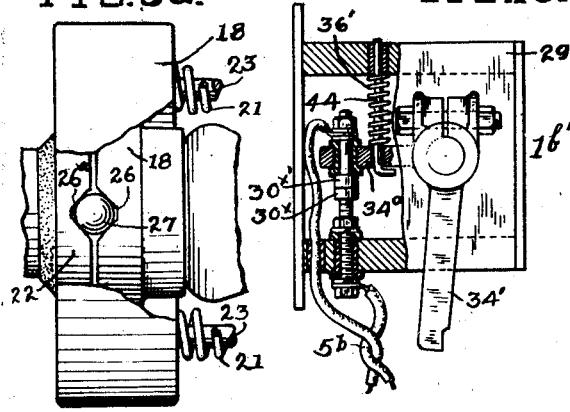
Fig. 5a is a fragmentary plan view, with parts broken away.
Fig. 10 is a view of the switch box, partly in section.

The rods 23 are shown rigidly mounted in openings 23a formed in the disk 22, being secured therein in any suitable manner, but preferably having screw threaded engagement with the walls of the opening. The opposing faces of the annular member 18 and disk 22 are formed with radially extending related grooves or channels 26, 26', respectively, preferably at either side of the shaft 14 and diametrically arranged, and in each two related channels I provide a ball 27 (preferably a steel ball), which forms an interlocking element between the side walls of the adjacent channels to drivingly connect the disk and annular member together, whereby the latter drives the disk 22 and through it the sprocket 10. As shown in Figs. 4, 5 and 5a, the side walls 26a of the channels 26, 26', are inclined outwardly relative to their median lines and operate as cams for the balls, so that in the event any relative movement between the annular member 18 and disk 22 takes place, the engagement of the balls 27 with oppositely disposed inclined walls or cams 26a will cause the disk 22 to move away from the annular member 18 axially of the shaft 14 against the tension of the springs 21, such movement of the disk serving to actuate the motor control elements 1b as later set forth, as shown in dotted lines in Fig. 3. The disk 22 is provided on its periphery with a ring 28, which encloses the annular member 18 and forms outer end walls for the related channels 26, 26', to prevent the escape of the balls 27, the collar 16a serving to limit the inward movement of the balls 27. The ring 28 is secured to the periphery of the disk 22 by bolts 28'.

The motor control elements comprise the following: 29 indicates a casing suitably supported by the chassis 4 and enclosing a pair of switch contacts 30, 30', one thereof (30) being connected to a lead of the circuit 5b and supported in an insulator 30a mounted in one wall of the casing. The other contact (30') is connected to the other lead of the circuit 5b and carried by the arm 31 of a sleeve 32, which is adjustably fixed by a set screw 33 to a thrust member 34. The thrust member 34 is slidably supported in suitable openings 35 formed in opposite side walls of the casing 29 to move endwise, the inner end of the member being related to the disk 22, that is, in close relation thereto, so that movement of the disk axially of the shaft operates to move the thrust member endwise and thus disengage the contact 30' from the contact 30. As will be understood, the disengagement of the contacts 30, 30', breaks the circuit and thus stops the motor 5. Surrounding the thrust member and between the sleeve 32 and rear side wall of casing 29 I provide a spring 36 which normally tends to move the thrust member 34 in that direction which maintains the contacts 30, 30', in electrical engagement and the inner of the thrust member in operative relation to the disk 22. The adjustment of the sleeve 32 on the thrust member permits the tension of the spring to be regulated. It will be noted that the spring 36 normally tends to hold the contact 30' in engagement with the contact 30, so that the latter serves as a stop to limit the endwise movement of the member 34 and to determine the distance between its inner end and the outer face of the disk 22. Accordingly, by adjusting the shank 30b (which supports the contact 30) endwise in the insulator 30a, the distance between these parts may be adjusted, as desired, so as to require a greater or lesser axial movement of the disk 22 to break the circuit.

In operation, the power of the shaft 9 is transmitted through the elements 18, 27, 22, to the sprocket 10 to rotate the drum 2, the springs 21 being set to maintain these elements in operative and power transmitting relation within any predetermined maximum resistance, for example, a load of 10,000 lbs. Accordingly, the winch drum 2 may be operated to raise a load weighing 10,000 lbs. or less, but if attempt is made to raise a load weighing in excess of this maximum, the springs 21 will yield due to the torque resistance on the disk 22, and permit relative rotative movement between the annular member 18 and disk 22 and by reason of such relative movement the coaction between the balls 27 and cam surfaces 26, 26a will effect movement of the disk 22 axially of the shaft 14. The disk 22, when moved, will engage the thrust member 34 and through it open the circuit 5b as already set forth. Upon release of the load, the springs 21 will return the member 18 and disk 22 into operative relation. The outer ends of the openings 19 are large enough to provide a space around the rods 23 so that danger of contact of the rods with the walls of the openings during relative rotative movement of the member 18 and disk 22 is avoided.

Figs. 6, 7, 8, 9 and 10 illustrate a different embodiment of the invention, wherein the power take-off, indicated as an entirety at 7' is arranged to be connected to and disconnected from the propeller shaft 37 (see Fig. 6). A shaft 9', which is driven by the power take-off 7', carries on its end portion, power transmitting elements, indicated as an entirety at 1a', and the sprocket 10 for the chain 11 to drive the winch drum 2, as shown in Figs. 6 and 7.

The motor control elements, indicated as an entirety at 1b', are mounted in a casing 29', which is supported on a bracket 29a (see Fig. 6). In this arrangement, the lever 8 adjacent the driver's position is connected by a link 8a to a lever 8b, the latter in turn being connected to the element of the power take-off 7' that effects driving connection with the propeller shaft 37.

Figure 9A:
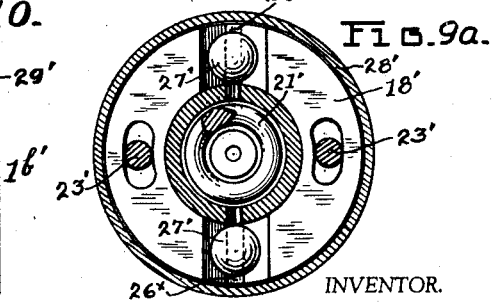
Fig. 9a is a section on the line 9a—9a of Fig. 8.

Referring particularly to Fig. 8, the power transmitting elements 1a' comprise the following: 38 indicates a tubular member fitting the end portion of the shaft 9' and suitably keyed thereto, whereby the tubular member is driven by the shaft. The tubular member 38 is secured against a shoulder 39 on the shaft by a bolt 40 engaging a washer 41, which is seated on an internal shoulder in the tubular member 38, the bolt being threaded into an opening formed in the end of the shaft 9'. At and surrounding its outer end the tubular member 38 is provided with a ring 18', which is preferably welded to the tubular member 38, as shown at 18a. The ring 18' is formed with a plurality of openings 19', preferably two openings in diametrical relation, for a purpose later set forth. 22' indicates an annulus, formed integrally with a hub 22a', loosely fitting the tubular member inwardly of the ring 18', the hub 22a' having fixed to it the sprocket 10 (the sprocket 10 and hub 22a' being preferably integral). The annulus 22' is arranged to rotate and slide endwise on the tubular member 38 as will later appear. 23' indicates a plurality of rods, one for each opening 19', threaded at their inner ends into openings formed in the annulus 22'. The rods 23' extend through the openings 19' and support at their outer ends an abutment 42, nuts 25' being threaded on the free ends of the rods to limit the outward movement of the abutment. Within the tubular member 38 and between the end of the shaft 9' and the abutment 42 is provided a coiled spring 21', which normally tends to force the abutment 42 outwardly axially of the shaft 9', and the abutment in turn through the nuts 25' and rods 23' normally forces the annulus 22' toward the ring 18'. The opposed faces of the ring 18' and annulus 22' diametrically of the axis of the shaft 9' and tubular member 38, are formed with related radially extending grooves 26x, each having outwardly inclined side walls 26a' adapted to serve as cams. 27' indicates balls, preferably formed of steel, one mounted in each two related grooves 26x, and forming an interlock between the ring 18' and annulus 22', whereby the hub 22a' and sprocket 10 are driven. The spring 21' serves to maintain these parts in operative or driving relation, but permits the hub 22a' and annulus 22' to move axially of the shaft 9' and tubular member 38 in the event the load on the sprocket exceeds a predetermined limit. In the event that an excessive load on the sprocket 10 results, the ring 18' will rotate relative to the annulus 22' and as a result thereof the balls 27', through their engagement with the opposite cam walls 26a', will move the annulus axially of the tubular member 38 and, through its engagement with a lever 34', operate the motor control elements 1b' (later referred to), whereby the circuit 5b will be opened. The openings 19' are elongated, as shown in Fig. 9a, to permit of the relative rotative movement between the ring 18' and annulus 22' without danger of the rods 23' engaging with the walls of the openings. The annulus 22' is provided with a collar 28' extending beyond the end thereof to enclose the ring 18' and abutment 42 and to form end walls for the grooves 26x. As the abutment is round, it is guided by the inner walls of the collar 28'. The collar 28' is secured to the annulus 22' in any desired manner. The collar 28' is provided with an annular rib 43 which forms a shoulder to engage the operating member 34' of the motor control elements 1b', when the annulus 22' is moved axially due to an excessive load on the sprocket 10.

The motor control elements 1b' comprise the following: 30x, 30x', indicate the switch contacts connected to the leads of the circuit 5b. The contact 30x is mounted on but suitably insulated from one wall of the casing 29', whereas the contact 30x' is mounted on but suitably insulated from an arm 34a connected to and operated by the member 34'. The operating member 34' is fixed to a rock shaft 35b, which is suitably mounted in the walls of the casing 29'. A coiled spring 36' surrounding and guided by a rod 44 and disposed between the arm 34a and the adjacent wall of the casing normally tends to swing the arm 34a and member 34' counterclockwise, as viewed in Fig. 10, so as to maintain the contact 30x' in engagement with the contact 30x and the outer end of the member 34' in operative relation to the rib 43. The rod 44 is supported at its opposite ends by the arm 34a and adjacent casing wall, such ends extending through openings formed in these parts and then bent laterally, as shown in Fig. 10.

To those skilled in the art to which my invention relates many changes in construction and widely differing embodiments and applications of the invention will suggest themselves without departing from its spirit and scope. My disclosures and the description herein are purely illustrative and are not intended to be in any sense limiting.

What I claim is:

1. In mechanism of the class described, the combination of a rotatably mounted member adapted to be drivingly connected to a mechanism for handling loads, a driving member in concentric relation to said first mentioned member, one of said members being movable relative to the other member in the direction of its axis, a spring mechanism connected to one of said members and engaging the other member and normally tending to move said members toward each other, and interlocking means between and engaging said members and operating to transmit power from said driving member to said first mentioned member, but arranged to move said axially movable member away from the other member when said driving member rotates relative to said first mentioned member.

2. In mechanism of the class described, the combination with a mechanism to be driven, a motor and an electric circuit including a spring-operated normally closed switch arranged when opened to stop said motor, of concentrically related elements mounted to permit relative rotative movements between them, one of said elements being connected to and driven by said motor and the other element being connected to and operable to drive said mechanism, one of said elements being movable in the direction of its axis, the opposed faces of said elements being provided with related cams, a separate element between said elements in operative relation to said cams and interlockingly engaged therewith to drivingly connect said elements together, a spring connected to one of said elements and arranged to bear against the other of said elements and normally tending to prevent axial movement of said axially movable element relative to the other element and arranged to yield when the torque resistance on the element connected to said mechanism exceeds the tension of said spring and permits relative rotative movement between said elements, whereby said separate element co-acts with said cams to move the movable element axially, and a device connected to the movable contact of said switch arranged to be moved by said axially movable element.

3. In mechanism of the class described, the combination with an electric circuit, including a switch adapted to control the operation of a motor and a shaft driven by the motor, a pair of elements disposed in opposed relation, one of said elements being fixed to said shaft and the other element rotatably and slidably fitting said shaft and adapted to drive a mechanism, the opposed faces of said elements being formed with related radially extending cam walls, a device between and engaging said cam walls, for drivingly connecting said elements together, whereby the motor driven element rotates said other element, a spring connected to said rotatable and slidable element and bearing against a portion of the other element and normally tending to maintain them in power transmitting relation, but arranged to yield when the torque resistance on said element connected to the mechanism exceeds the tension of said spring, whereby said element connected to said shaft rotates relative to said rotatable and slidable element and said device coacts with said cam walls to move the latter element away from the element connected to said shaft.

4. In mechanism of the class described, the combination with a mechanism to be driven by a motor, of a pair of power transmitting elements between the shaft driven by the motor and said mechanism, one thereof being connected to and driven by the shaft and the other element being operatively connected to said mechanism for driving it and free to rotate relative to the shaft, whereby said first mentioned element may rotate relative to said second mentioned element, one of said elements being movable in the direction of its axis, an interlock between and engaging said elements for drivingly connecting them together but arranged to move the axially movable element relative to the other element when relative rotative movement between said elements takes place, a spring connected to one of said elements and engaging the other element and normally tending to move the axially movable element toward the other element, and means operated by said axially movable element to stop the motor.

5. In mechanism of the class described, the combination with a mechanism to be driven and a motor driven shaft, of an annular element connected to and driven by said shaft, a separate, annular element for driving said mechanism, the last mentioned element being free to rotate relative to said shaft and move thereon in the direction of its axis, said elements having concentrically opposed portions formed with related radially extending channels the side walls of which are shaped to provide cams, a device in said channels for drivingly connecting said elements together but arranged to co-act with said cams due to relative rotative movement of said elements and move the axially movable element away from said element connected to said shaft, spring means connected to said axially movable element and bearing against said other element and normally tending to move said axially movable element toward said other element and maintain said device in driving relation to said cams but arranged to yield when the torque reaction on said separate element exceeds the tension of said spring means and permit the driven element to rotate relative to said separate element, whereby said device moves the axially movable element away from the other element, and means operated by said axially movable element for stopping the motor.

6. In mechanism of the class described, the combination of a pair of power driven elements mounted to rotate one relative to the other about a common axis, one thereof being adapted to be driven and the other being adapted to drive a load handling mechanism, said last mentioned element being mounted to move in the direction of its axis away from and toward said driven element, an interlock between and engaging said elements for drivingly connecting them together but arranged to move the axially movable element relative to said driven element when relative rotative movement between said elements takes place, a rod carried by one of said elements and provided with an abutment at its outer end, a spring between the other element and said abutment normally tending to move said axially movable element toward said driven element to maintain them and said interlock in driving relation but permitting relative rotative movements between said elements when the tension of said spring is exceeded, and means operated by the axially movable element for stopping the driving means for said driven element.

7. In mechanism of the class described, power transmitting elements comprising disks mounted to rotate relative to each other on a common axis, one thereof being driven and the other being adapted to drive a load handling mechanism, one of said disks being movable in the direction of its axis away from the other disk, the opposed walls of said disks being formed with related recesses each having inclined sides, an interlock in said recesses between the sides thereof for drivingly connecting the disks together but arranged to co-act with said sides to move the axially movable disk relative to the other disk when relative rotative movement between said disks takes place, and a spring connected to one of said disks and arranged to bear against the other disk and normally tending to prevent axial movement of said axially movable disk, whereby said disks and interlock are maintained in power transmitting relation.

8. In mechanism of the class described, the combination with a shaft and driving means therefor, of a tubular member fixed at its inner end to and extending axially of said shaft beyond the end thereof, power transmitting elements comprising an annulus mounted to rotate relative to and slide endwise on said tubular member and provided with an element adapted to drive a load handling mechanism, a ring fixed to and surrounding the outer end of said tubular member, the opposed walls of said annulus and ring being formed with related recesses each having inclined sides, an interlock in said recesses between the sides thereof for drivingly connecting said annulus and ring together but arranged to co-act with said sides to slide said annulus relative to said tubular member when relative rotative movement between said annulus and ring takes place, an abutment supported by said annulus on that side of said ring remote from said annulus and a spring in said tubular member between the end of said shaft and said abutment and normally tending to move said annulus toward said ring, and means operated by the sliding movement of said annulus for stopping said driving means.

9. In mechanism of the class described, the combination with a shaft and driving means therefor, of a tubular member fixed at its inner end to and extending axially of said shaft beyond the end thereof, power transmitting elements comprising an annulus mounted to rotate on and slide endwise on said tubular member and provided with an element adapted to drive a load handling mechanism, a ring fixed to the outer end of said tubular member, the opposed walls of said annulus and ring being formed with related recesses each having inclined sides, an interlock in said recesses between the sides thereof for drivingly connecting said annulus and ring together but arranged to co-act with said sides to slide said annulus endwise relative to said tubular member when relative rotative movement between said annulus and ring takes place, an abutment supported by said annulus on that side of said ring remote from said annulus and a spring in said tubular member between the end of said shaft and said abutment and normally tending to move said annulus toward said ring, means operated by the sliding movement of said annulus for stopping said driving means, and a collar carried by said annulus and enclosing said ring and abutment and serving as a guide for the latter.

10. In mechanism of the class described, the combination with a shaft and driving means therefor, of a tubular member fixed at its inner end to and extending axially of said shaft beyond the end thereof, power transmitting elements comprising an annulus mounted to rotate relative to and slide endwise on said tubular member and provided with an element adapted to drive a load handling mechanism, a ring fixed to and surrounding the outer end of said tubular member, the opposed walls of said annulus and ring being formed with related recesses each having inclined sides, an interlock in said recesses between the sides thereof for drivingly connecting said annulus and ring together but arranged to co-act with said sides to slide said annulus endwise relative to said tubular member when relative rotative movement between said annulus and ring takes place, diametrically arranged rods carried by said annulus and extending through enlarged openings formed in said ring, an abutment supported by the outer ends of said rods, a spring in said tubular member between the end of said shaft and said abutment and normally tending to move said annulus toward said ring, and means operated by the sliding movement of said annulus for stopping said driving means.

11. A mechanism of the class described, the combination with a mechanism to be driven by a motor, of a pair of power transmitting elements, one thereof being connected to and driven by the motor and the other element being connected to said mechanism for driving it, said last mentioned element being mounted to rotate independently of said first mentioned element, whereby the latter element may rotate relative to said second mentioned element, one of said elements being movable in the direction of its axis, an interlock between and engaging said elements for drivingly connecting them together, but arranged to move the axially movable element relative to the other element when relative rotative movement between said elements takes place, a spring mechanism connected to said axially movable element and bearing against the other element and normally tending to move the axially movable element toward said other element, and means operated by said axially movable element for stopping the motor.

12. A mechanism of the class described, the combination with a mechanism to be driven by a motor, of a pair of power transmitting disks disposed in substantially face to face relation and mounted to rotate one relative to the other about a common axis, one thereof being connected to and driven by the motor and the other disk being connected to said mechanism for driving it, said last mentioned disk being mounted to move in the direction of its axis toward and from said driven disk, the opposed faces of said disks being provided with related, radially extending recesses, the recesses in each disk face being uniformly spaced, rods carried by said axially movable disk and extending through enlarged openings formed in said driven disk and provided with abutments on their outer ends, expansion springs between said abutments and said driven disk and normally tending to move said axially movable disk toward said driven disk, interlocking elements between and engaging the walls of said recesses for drivingly connecting said disks together, but arranged to move the axially movable disk relative to said driven disk when relative rotative movement between said disk takes place, and means operated by said axially movable disk for stopping said motor.

PAUL E. HAWKINS.